United States Patent
Chong et al.

(10) Patent No.: US 12,475,120 B2
(45) Date of Patent: Nov. 18, 2025

(54) AUXILIARY QUERY OPTIMIZER PROVIDING IMPROVED QUERY PERFORMANCE

(71) Applicant: SAP SE, Walldorf (DE)

(72) Inventors: Jaehyok Chong, Seoul (KR); Young Goo Cho, Seoul (KR)

(73) Assignee: SAP SE, Walldorf (DE)

( * ) Notice: Subject to any disclaimer, the term of this patent is extended or adjusted under 35 U.S.C. 154(b) by 5 days.

(21) Appl. No.: 18/382,025

(22) Filed: Oct. 19, 2023

(65) Prior Publication Data

US 2025/0130995 A1    Apr. 24, 2025

(51) Int. Cl.
*G06F 16/2453* (2019.01)
*G06F 16/245* (2019.01)
*G06F 16/2455* (2019.01)
*G06F 16/2457* (2019.01)

(52) U.S. Cl.
CPC .... *G06F 16/24542* (2019.01); *G06F 16/2455* (2019.01); *G06F 16/24573* (2019.01)

(58) Field of Classification Search
CPC ........... G06F 16/24542; G06F 16/2455; G06F 16/24573; G06F 16/2453; G06F 16/24569
See application file for complete search history.

(56) References Cited

U.S. PATENT DOCUMENTS

| | | | |
|---|---|---|---|
| 9,501,536 B1 * | 11/2016 | El-Helw | G06F 16/24542 |
| 2004/0010488 A1 * | 1/2004 | Chaudhuri | G06F 16/2462 |
| 2008/0091668 A1 * | 4/2008 | Dettinger | G06F 16/2471 |
| | | | 707/999.005 |
| 2009/0030874 A1 * | 1/2009 | Das | G06F 16/24542 |
| 2009/0281992 A1 * | 11/2009 | Bestgen | G06F 9/5027 |
| 2010/0030758 A1 | 2/2010 | Belknap et al. | |
| 2017/0255673 A1 * | 9/2017 | Li | G06F 16/24542 |
| 2018/0349364 A1 * | 12/2018 | Arnold | G06F 16/901 |
| 2023/0273925 A1 * | 8/2023 | Li | G06F 11/3419 |
| | | | 707/713 |

OTHER PUBLICATIONS

Wang et al., "INUM+: A learner, more accurate and more efficient fast what-if optimizer," Data Engineering Workshops (ICDEW), 2013, IEEE 29th International Conference on, IEEE, Apr. 8, 2013, pp. 50-55, XP032431590.

Pavlopoulou et al., "Revisiting Runtime Dynamic Optimization for Join Queries in Big Data Management Systems," arxiv.org, Cornell University Library, 201 Olin Library Cornell University Ithaca, NY, Oct. 2, 2020, XP081776517.

Extended European Search Report received in European Application No. 24206871.6, dated Mar. 13, 2025, 10 pages.

* cited by examiner

*Primary Examiner* — Robert W Beausoliel, Jr.
*Assistant Examiner* — Mohammad S Bhuyan
(74) *Attorney, Agent, or Firm* — Klarquist Sparkman, LLP

(57) ABSTRACT

Techniques and solutions are provided for improved query optimization, including for sub-portions of a query plan. A query is submitted to an inline query optimizer and at least one auxiliary query optimizer. The query is optimized by the inline query optimizer and the auxiliary query optimizer. A query processor can evaluate costs associated with query plans produced by the inline query optimizer and the auxiliary query optimizer and select a plan for execution that is most performant.

20 Claims, 11 Drawing Sheets

AUXILIARY QUERY OPTIMIZER PROVIDING IMPROVED QUERY PERFORMANCE

FIELD

The present disclosure generally relates to query optimization. Particular implementations relate to optimizing queries using one or more auxiliary query optimizers.

BACKGROUND

Modern database systems frequently process vast amounts of data. Queries in such systems can access a multitude of tables and views, each with numerous attributes. Enterprise-level software applications often employ queries involving hundreds of tables, some of which might have hundreds of attributes. These queries can encompass a wide range of operations, including diverse join operations with varying conditions, and other tasks such as grouping and ordering.

When a query is presented to a database system, components like a query optimizer generate computer-executable commands for the operations specified in the query. This optimizer analyzes the query to identify efficient execution paths. It may choose specific data access methods or even consider rewriting segments of the query for better performance.

Query optimizers employ various techniques, including rule-based and cost-based methods. However, as a query plan becomes more complex, the number of potential plans (and their variations) that an optimizer might consider-referred to as the search space-expands nearly exponentially. Often, due to time and computational constraints, the optimizer cannot evaluate every potential plan within this space.

In a production database system, an "inline" query optimizer is typically used to process incoming queries. An inline query optimizer is typically configured using an assumption that a computing process is waiting for a result from the query optimizer. For example, it is typically assumed that a query optimizer should complete its operations within a general time range so as not to overly delay query execution.

Query performance can depend on a query optimizer in a number of ways. As described above, the longer a query optimizer takes to generate a query plan, the longer it takes for query execution results to be generated. However, the quality of the query plan also affects execution time, and can also affect a degree to which computing resources are used during query execution.

It can be difficult to change the nature of a particular query optimizer, or even particular operations performed by a query optimizer or configuration settings for a query optimizer. That is, making changes to a query optimizer can cause performance regression, and in some cases may serve as a deterrent to changing a query optimizer in ways that could potentially improve query performance, since it may also degrade query performance, which may be unacceptable in a production setting. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, the present disclosure provides a process of executing a query using a query plan optimized by an auxiliary query optimizer or an inline query optimizer. A query is received. A first query plan for the query is generated. A third query plan is sent to an auxiliary query optimizer. The third query plan is the first query plan, or a second query plan generated at least in part from the first query plan.

A fourth query plan is optimized with the auxiliary query optimizer to provide a first optimized query plan. The fourth query plan is the third query plan, or a query plan generated at least in part from the third query plan.

The first query plan or the second query plan is optimized with an inline query optimizer to provide a second optimized query plan. A fifth query plan is executed in response to a first instance of the query. The fifth query plan is generated based at least in part on the first optimized query plan or the second optimized query plan. Execution of the fifth query plan provides query execution results. Query execution results are returned in response to the first instance of the query.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Figure 1:
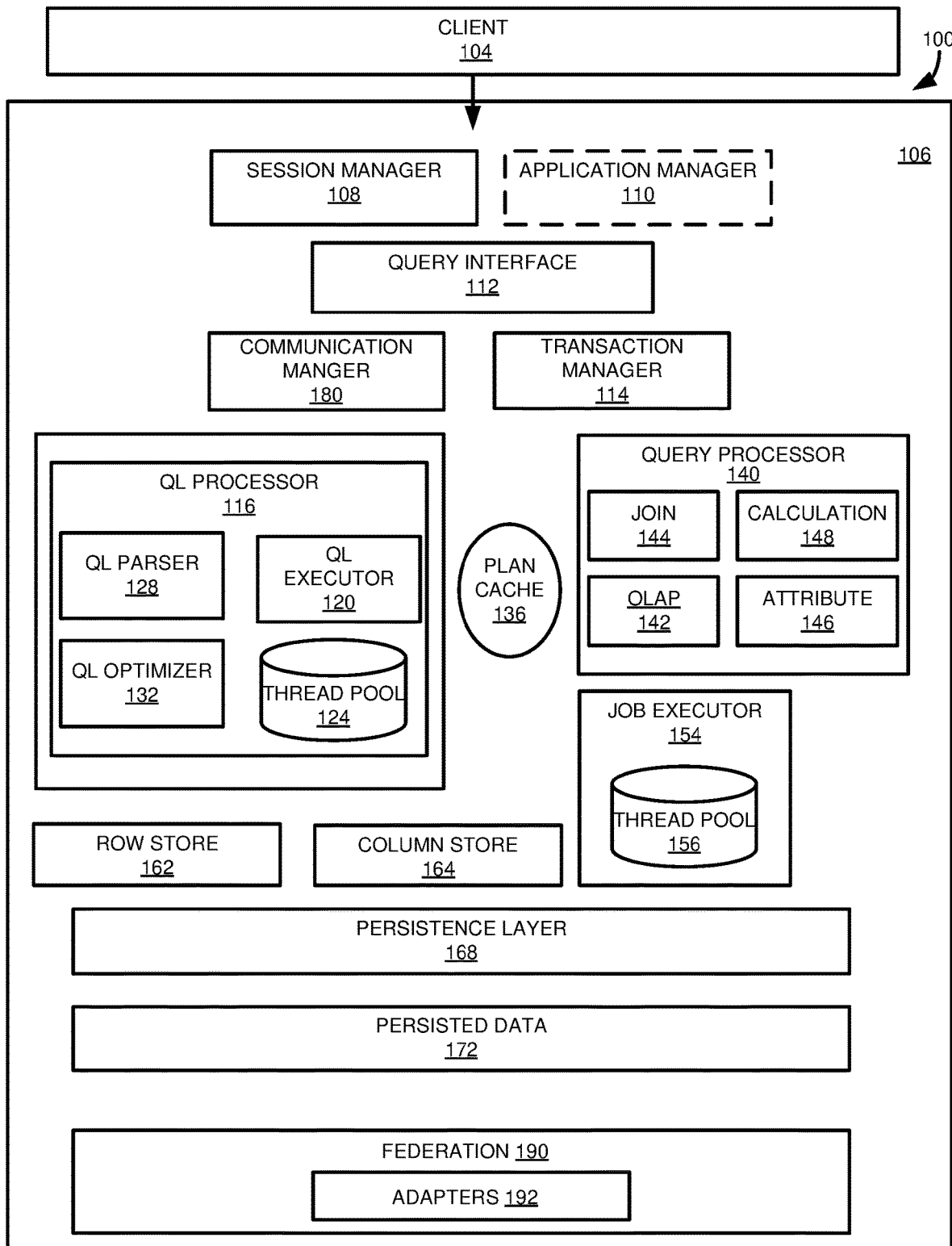
FIG. 1 is a diagram depicting an example database system which can be used in implementing aspects of disclosed technologies.

Modern database systems frequently process vast amounts of data. Queries in such systems can access a multitude of tables and views, each with numerous attributes. Enterprise-level software applications often employ queries involving hundreds of tables, some of which might have hundreds of attributes. These queries can encompass a wide range of operations, including diverse join operations with varying conditions, and other tasks such as grouping and ordering.

When a query is presented to a database system, components like a query optimizer generate computer-executable commands for the operations specified in the query. This optimizer analyzes the query to identify efficient execution paths. It may choose specific data access methods or even consider rewriting segments of the query for better performance.

Query optimizers employ various techniques, including rule-based and cost-based methods. However, as a query plan becomes more complex, the number of potential plans (and their variations) that an optimizer might consider-referred to as the search space-expands nearly exponentially. Often, due to time and computational constraints, the optimizer cannot evaluate every potential plan within this space.

In a production database system, an "inline" query optimizer is typically used to process incoming queries. An inline query optimizer is typically configured using an assumption that a computing process is waiting for a result from the query optimizer. For example, it is typically assumed that a query optimizer should complete its operations within a general time range so as not to overly delay query execution.

Query performance can depend on a query optimizer in a number of ways. As described above, the longer a query optimizer takes to generate a query plan, the longer it takes for query execution results to be generated. However, the quality of the query plan also affects execution time, and can also affect a degree to which computing resources are used during query execution.

It can be difficult to change the nature of a particular query optimizer, or even particular operations performed by a query optimizer or configuration settings for a query optimizer. That is, making changes to a query optimizer can cause performance regression, and in some cases may serve as a deterrent to changing a query optimizer in ways that could potentially improve query performance, since it may also degrade query performance, which may be unacceptable in a production setting. Accordingly, room for improvement exists.

The present disclosure provides an auxiliary query optimization framework that can, among other things, address the issues noted above. In one aspect, a query can be received in a standard manner, such as checking to see whether an existing query plan exists for the query, parsing the query, and providing a logical query plan or abstract query plan produced from a parse tree provided by a parser to an inline query optimizer. The inline query optimizer can optimize the query plan, providing an optimized query plan. The optimized query plan can be provided to a plan generator, which can generate a physical query plan from an optimized logical or abstract query plan. The physical query plan can be executed by a query executor, which can optionally modify the physical query plan to a query execution plan, and then execute the query.

However, the query optimizer can also interact with an auxiliary query optimization framework that includes one or more auxiliary query optimizers. The auxiliary query optimizer includes differences from the inline query optimizer. As will be further described, an auxiliary query optimizer can be of a different "type" than the inline query optimizer.

An auxiliary query optimizer can also be of a same type as the inline query optimizer, but can use different configuration settings or parameters, or may include different techniques, than the inline query optimizer.

Optimized query plans, such as optimized logical query plans or optimized abstract query plans produced therefrom, can be generated by an auxiliary query optimizer, providing an auxiliary query plan. The inline query optimizer can use such auxiliary query plans, such in a processing flow for a particular execution instance of a query, or an auxiliary query plan can be considered for use for future execution instances of the query. Auxiliary query plans produced by an auxiliary query optimizer can be evaluated for performance efficiency, including by executing the query using the auxiliary query plan (such as using a physical or execution plan generated therefrom) and analyzing query execution results or query execution statistics (such as execution time or resource use). The results of this evaluation can be used to determine whether the auxiliary query plan should be used instead of a query plan generated by the inline query optimizer. The results can also be used to determine if the inline query optimizer should be replaced with an auxiliary query optimizer, or modified to include logic of the auxiliary query optimizer.

In addition to queries received in a production environment, the auxiliary query optimization framework can receive queries from other sources, and can provide query plans to other recipients. In exchanging information about queries and query plans between the auxiliary query optimization framework and other computing components, including a database system having an inline query optimizer, an abstract query plan format can be used. An example abstract query plan format is described in U.S. Patent Publication No. 2023/0074090, incorporated by reference herein to the extent not inconsistent with the present disclosure. Other types of abstract query plans can be used, including those known in the relevant art, and as will be described as the specification proceeds.

An abstract query plan can allow queries to be optimized on computing systems other than a production system, for example, where such other computing system may not have access to metadata of the production system. In particular implementations, an abstract query plan can include a representation of a query (such as a relational algebraic representation), metadata information for objects used in the query, and optionally additional information such as base table column histograms, estimated intermediate result counts (such as determined by a query optimizer of the production system), and runtime feedback obtained by the query optimizer of the production system from executions of the query on the production system (including actual result counts).

Thus, in addition to scenarios where a query is provided to an offline query optimizer to generate a query plan, such as to allow more thorough search for a more efficient query plan, disclosed techniques can allow query plans to be generated using query optimizers operating using different principles or settings than a "primary" or inline query optimizer. These results can be optionally used by an inline query optimizer, without altering the functionality of the inline processor. Thus, more efficient query plans can be used in a production setting, with reduced risk of degrading query performance compared with a baseline provided by the inline query optimizer. In addition, the use of auxiliary query optimizers can allow queries to be optimized using techniques that are more specific to a particular type of query, such as distributed queries, where a standard query optimizer used in a production environment may either not optimize queries based on those considerations, or may provide more limited optimization than possible using a special-purpose query optimizer.

Example 2 describes an example database system that can be used in implementing disclosed technologies, such as including a query optimizer than implements disclosed techniques. Examples 3-8 describe different types of query plans, representations of queries and query plans, and the use of the auxiliary query optimization framework.

Example 2—Example Database Architecture

FIG. 1 illustrates an example database environment 100. The database environment 100 can include a client 104. Although a single client 104 is shown, the client 104 can represent multiple clients. The client or clients 104 may be OLAP clients, OLTP clients, or a combination thereof.

The client 104 is in communication with a database server 106. Through various subcomponents, the database server 106 can process requests for database operations, such as requests to store, read, or manipulate data (i.e., CRUD operations). A session manager component 108 can be responsible for managing connections between the client 104 and the database server 106, such as clients communicating with the database server using a database programming interface, such as Java Database Connectivity (JDBC), Open Database Connectivity (ODBC), or Database Shared Library (DBSL). Typically, the session manager 108 can simultaneously manage connections with multiple clients 104. The session manager 108 can carry out functions such as creating a new session for a client request, assigning a client request to an existing session, and authenticating access to the database server 106. For each session, the session manager 108 can maintain a context that stores a set of parameters related to the session, such as settings related to committing database transactions or the transaction isolation level (such as statement level isolation or transaction level isolation).

For other types of clients 104, such as web-based clients (such as a client using the HTTP protocol or a similar transport protocol), the client can interface with an application manager component 110. Although shown as a component of the database server 106, in other implementations, the application manager 110 can be located outside of, but in communication with, the database server 106. The application manager 110 can initiate new database sessions with the database server 106, and carry out other functions, in a similar manner to the session manager 108.

The application manager 110 can determine the type of application making a request for a database operation and mediate execution of the request at the database server 106, such as by invoking or executing procedure calls, generating query language statements, or converting data between formats useable by the client 104 and the database server 106. In particular examples, the application manager 110 receives requests for database operations from a client 104, but does not store information, such as state information, related to the requests.

Once a connection is established between the client 104 and the database server 106, including when established through the application manager 110, execution of client requests is usually carried out using a query language, such as the structured query language (SQL). In executing the request, the session manager 108 and application manager 110 may communicate with a query interface 112. The query interface 112 can be responsible for creating connections with appropriate execution components of the database server 106. The query interface 112 can also be responsible for determining whether a request is associated with a previously cached statement or a stored procedure, and calling the stored procedure or associating the previously cached statement with the request.

At least certain types of requests for database operations, such as statements in a query language to write data or manipulate data, can be associated with a transaction context. In at least some implementations, each new session can be assigned to a transaction. Transactions can be managed by a transaction manager component 114. The transaction manager component 114 can be responsible for operations such as coordinating transactions, managing transaction isolation, tracking running and closed transactions, and managing the commit or rollback of transactions. In carrying out these operations, the transaction manager 114 can communicate with other components of the database server 106.

The query interface 112 can communicate with a query language processor 116, such as a structured query language processor. For example, the query interface 112 may forward to the query language processor 116 query language statements or other database operation requests from the client 104. The query language processor 116 can include a query language executor 120, such as a SQL executor, which can include a thread pool 124. Some requests for database operations, or components thereof, can be executed directly by the query language processor 116. Other requests, or components thereof, can be forwarded by the query language processor 116 to another component of the database server 106. For example, transaction control statements (such as commit or rollback operations) can be forwarded by the query language processor 116 to the transaction manager 114. In at least some cases, the query language processor 116 is responsible for carrying out operations that retrieve or manipulate data (e.g., SELECT, UPDATE, DELETE). Other types of operations, such as queries, can be sent by the query language processor 116 to other components of the database server 106. The query interface 112, and the session manager 108, can maintain and manage context information associated with requests for database operation. In particular implementations, the query interface 112 can maintain and manage context information for requests received through the application manager 110.

When a connection is established between the client 104 and the database server 106 by the session manager 108 or the application manager 110, a client request, such as a query, can be assigned to a thread of the thread pool 124, such as using the query interface 112. In at least one implementation, a thread is associated with a context for executing a processing activity. The thread can be managed by an operating system of the database server 106, or by, or in combination with, another component of the database server. Typically, at any point, the thread pool 124 contains a plurality of threads. In at least some cases, the number of threads in the thread pool 124 can be dynamically adjusted, such in response to a level of activity at the database server 106. Each thread of the thread pool 124, in particular aspects, can be assigned to a plurality of different sessions.

When a query is received, the session manager 108 or the application manager 110 can determine whether an execution plan for the query already exists, such as in a plan cache 136. If a query execution plan exists, the cached execution plan can be retrieved and forwarded to the query language executor 120, such as using the query interface 112. For example, the query can be sent to an execution thread of the thread pool 124 determined by the session manager 108 or the application manager 110. In a particular example, the query plan is implemented as an abstract data type.

If the query is not associated with an existing execution plan, the query can be parsed using a query language parser 128. The query language parser 128 can, for example, check query language statements of the query to make sure they have correct syntax, and confirm that the statements are otherwise valid. For example, the query language parser 128 can check to see if tables and records recited in the query language statements are defined in the database server 106.

The query can also be optimized using a query language optimizer 132. The query language optimizer 132 can manipulate elements of the query language statement to allow the query to be processed more efficiently. For example, the query language optimizer 132 may perform operations such as unnesting queries or determining an optimized execution order for various operations in the query, such as operations within a statement. After optimization, an execution plan can be generated, or compiled, for the query. In at least some cases, the execution plan can be cached, such as in the plan cache 136, which can be retrieved (such as by the session manager 108 or the application manager 110) if the query is received again.

The query optimizer 132 can also implement techniques of the present disclosure. For example, the query optimizer 132 can communicate with an auxiliary query optimization framework. The auxiliary query optimization framework can be part of the database server 106, or the database server can communicate with an auxiliary query optimization framework that is remote to the database server. The query optimizer 132, as part of the query language processor 116—which includes components like the parser 128 and the query language executor 120—can also facilitate the conversion between different query and query plan formats. For instance, it might convert between a representation of a query or a logical query plan and an abstract query plan. This conversion can involve generating one representation from another, and might entail adding or removing specific information to or from a given representation.

Once a query execution plan has been generated or received, the query language executor 120 can oversee the execution of an execution plan for the query. For example, the query language executor 120 can invoke appropriate subcomponents of the database server 106.

In executing the query, the query language executor 120 can call a query processor 140, which can include one or more query processing engines. The query processing engines can include, for example, an OLAP engine 142, a join engine 144, an attribute engine 146, or a calculation engine 148. The OLAP engine 142 can, for example, apply rules to create an optimized execution plan for an OLAP query. The join engine 144 can be used to implement relational operators, typically for non-OLAP queries, such as join and aggregation operations. In a particular implementation, the attribute engine 146 can implement column data structures and access operations. For example, the attribute engine 146 can implement merge functions and query processing functions, such as scanning columns.

In certain situations, such as if the query involves complex or internally parallelized operations or sub-operations, the query executor 120 can send operations or sub-operations of the query to a job executor component 154, which can include a thread pool 156. An execution plan for the query can include a plurality of plan operators. Each job execution thread of the job execution thread pool 156, in a particular implementation, can be assigned to an individual plan operator. The job executor component 154 can be used to execute at least a portion of the operators of the query in parallel. In some cases, plan operators can be further divided and parallelized, such as having operations concurrently access different parts of the same table. Using the job executor component 154 can increase the load on one or more processing units of the database server 106, but can improve execution time of the query.

The query processing engines of the query processor 140 can access data stored in the database server 106. Data can be stored in a row-wise format in a row store 162, or in a column-wise format in a column store 164. In at least some cases, data can be transformed between a row-wise format and a column-wise format. A particular operation carried out by the query processor 140 may access or manipulate data in the row store 162, the column store 164, or, at least for certain types of operations (such a join, merge, and subquery), both the row store 162 and the column store 164. In at least some aspects, the row store 162 and the column store 164 can be maintained in main memory.

A persistence layer 168 can be in communication with the row store 162 and the column store 164. The persistence layer 168 can be responsible for actions such as committing write transactions, storing redo log entries, rolling back transactions, and periodically writing data to storage to provided persisted data 172.

In executing a request for a database operation, such as a query or a transaction, the database server 106 may need to access information stored at another location, such as another database server. The database server 106 may include a communication manager 180 component to manage such communications. The communication manger 180 can also mediate communications between the database server 106 and the client 104 or the application manager 110, when the application manager is located outside of the database server.

In some cases, the database server 106 can be part of a distributed database system that includes multiple database servers. At least a portion of the database servers may include some or all of the components of the database server 106. The database servers of the database system can, in some cases, store multiple copies of data. For example, a table may be replicated at more than one database server. In addition, or alternatively, information in the database system can be distributed between multiple servers. For example, a first database server may hold a copy of a first table and a second database server can hold a copy of a second table. In yet further implementations, information can be partitioned between database servers. For example, a first database server may hold a first portion of a first table and a second database server may hold a second portion of the first table.

In carrying out requests for database operations, the database server 106 may need to access other database servers, or other information sources, within the database system, or at external systems, such as an external system on which a remote data object is located. The communication manager 180 can be used to mediate such communications. For example, the communication manager 180 can receive and route requests for information from components of the database server 106 (or from another database server) and receive and route replies.

The database server 106 can include components to coordinate data processing operations that involve remote data sources. In particular, the database server 106 includes a data federation component 190 that at least in part processes requests to access data maintained at a remote system. In carrying out its functions, the data federation component 190 can include one or more adapters 192, where an adapter can include logic, settings, or connection information usable in communicating with remote systems. Examples of adapters include "connectors" as implemented in technologies available from SAP SE, of Walldorf, Germany. Further, disclosed techniques can use technologies underlying data federation techniques such as Smart Data Access (SDA) and Smart Data Integration (SDI) of SAP SE.

Figure 2:
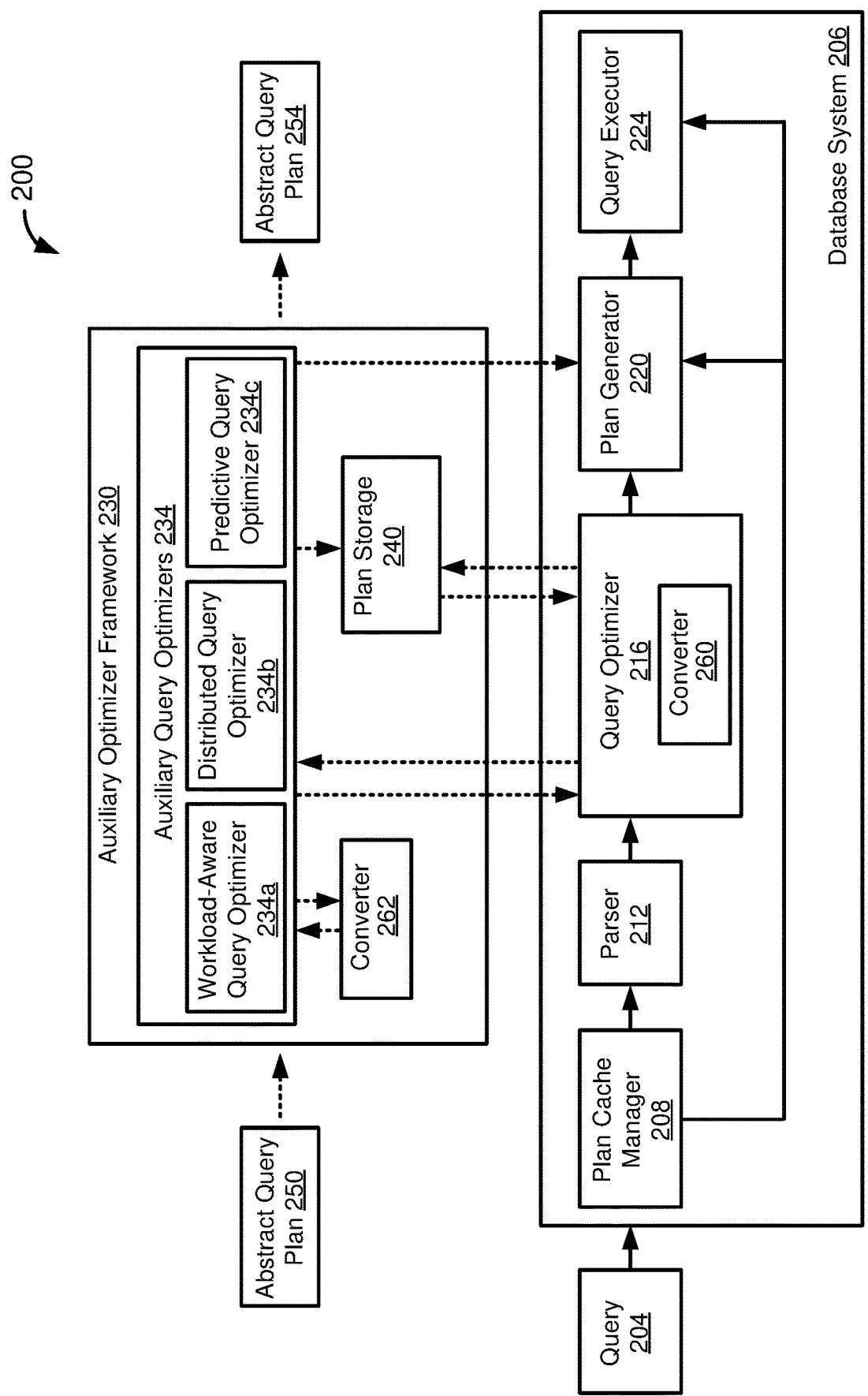
FIG. 2 illustrates a computing environment in which disclosed techniques can be implemented.

Example 3—Example Computing Environment with Inline Query Optimizer and Auxiliary Query Optimizer FIG. 2 illustrates an example computing environment 200 in which disclosed techniques can be implemented. At least a portion of the computing environment 200 can be part of a database environment, such as being part of the database server 106 of FIG. 1.

The computing environment 200 illustrates a typical pathway for processing requests for database operations, such as database operations specified in a query 204. The query 204 can be expressed in a suitable query language, such as SQL. The query 204 includes operations such as selecting data from particular database objects, such as tables, as well as operations such as aggregation operations, including determining sums, maximum or minimum values, averages, or counts, and can include grouping or ordering operations.

Components of a database system 206 can be used to process and execute the query 204, as well as to return query results in response to the query. A plan cache manager 208 can determine whether a cached query plan exists for the query 204. For example, the plan cache manager 208 can access the plan cache 136 of FIG. 1. In at least some cases, if the plan cache manager 208 determines that a query plan exists, a cached plan for the query 204 can be sent to a plan generator 220 or a query executor 224, such as depending on whether the cached plan is a logical plan, an abstract query plan, a physical plan, or an execution plan. The plan cache manager 208 can optionally be omitted from the computing environment 200.

If the plan cache manager 208 determines that a cached plan for the query 204 does not exist, or if the cache manager is omitted, the query 204 is parsed by a parser 212, which may have associated query rewrite or transformation functionality. The query 204 can optionally be sent to the parser 212 even if a cached plan exists, such as if the cached plan is older than a certain date or if a flag is set that indicates that an updated query plan should be created or is available for use. Situations where an updated query plan should be created include those where an existing plan has been invalided, such as resulting from a change in metadata for data objects referenced in the query or a change in the layout of data as stored in the database system 206. The parser 212 can perform operations such as checking that the syntax, structure, and semantics of the query 204 are correct. The parser 212 can also prepare a parse tree or abstract syntax tree. In some scenarios, an abstract syntax tree can be converted to a logical representation of the query 204, such as a logical query plan.

The query optimizer 216 explores alternative strategies to execute the query using the logical query plan or an abstract query plan as a starting point. Since the query optimizer 216 is part of a processing flow that results in query execution, the query optimizer can be referred to as an inline query processor. In the case where an abstract query plan is provided, it can be converted back to a logical query plan. This logical plan is then optimized by the query optimizer 216, which can access metadata and other relevant information from the abstract query plan during optimization. The query optimizer 216 can take into account, for example, different join orders, potential access paths like indexes, and other algorithmic choices. Depending on the particular implementation of the query optimizer 216, the query optimizer can use heuristics, cost models, and statistical data about the underlying datasets, and evaluate the probable performance of these strategies.

Once the query optimizer 216 determines the most efficient approach, it passes this optimized logical plan to the plan generator 220. The plan generator 220 translates the optimized logical plan into a physical plan, which provides concrete instructions about how a database engine (such as the query processor 140 or the job executor 154, as depicted in FIG. 1) should execute the query. This physical plan incorporates details about specific algorithms to use, data access methods, and other execution specifics. The plan generator 220 can also generate an execution plan, which includes granular details on how data should be accessed and manipulated. The execution plan can include cost estimates for various operations, and a query executor 224 can follow the instructions in the execution plan. The query executor 224 can collect data regarding execution of a query, which can be provided back to the query optimizer 216 to improve later optimizations.

An auxiliary optimizer framework 230 can interact with components of the query processing flow described above. For example, when the query optimizer 216 receives a logical query plan from the parser 212, the query optimizer can provide the logical query plan, or a representation of at least components thereof, to one or more auxiliary query optimizers 234 (shown as 234a-234c) of the auxiliary query optimization framework 230. In more particular examples, the query optimizer 216, or another component of the database system 206, can produce an abstract query plan that can be sent to the auxiliary query optimizer framework 230. While the auxiliary query optimization framework 230 may be able to optimize logical plans, greater optimization can be achieved using an abstract query plan, which can include metadata and annotations for use during optimization, as will be further described.

One or more of the auxiliary query optimizers 234 can prepare an optimized query plan, referred to as an auxiliary query plan, which can be stored in plan storage 240. The auxiliary plan can be in any suitable format, such as a logical query plan, an abstract query plan, or a physical query plan. Often, an abstract query plan is used, as it may have benefits for portability/sharing.

The query optimizer 216 can access the plan storage 240. In some cases, the query optimizer 216 can use plans from the plan storage 240 as part of an optimization process for a query. For example, if an auxiliary query optimizes 234 generates an optimized plan on or before completion of optimization by the query optimizer 216, or a specified time thereafter, the query optimizer can determine whether to use the logical query plan it determined or a logical query plan from, or generated from, the plan storage 240. In other cases, the query optimizer 216 can check for plans in the plan storage 240 during a later execution request for the query. In that regard, although not shown, the plan cache manager 208 can optionally determine whether a query plan is available in the plan storage 240. If so, the plan cache manager 208 can alert the query optimizer 216 that such a plan is available, and can optionally bypass processing by the parser 212.

The plan generator 220 can also have access to the auxiliary query optimizers 234, or to the plan storage 240. For example, after the production of an optimized query plan by the query optimizer 216, the plan generator 220 can determine whether that optimized query plan might be more or less efficient than using a plan developed by an auxiliary query optimizer 234. The plan generator 220 can also perform this action when it receives a query plan from the plan cache manager 208, rather than receiving a plan from the query optimizer 216.

Optionally, the auxiliary query optimization framework 230 can perform query optimization from sources in addition to the database system 206. For example, it may be desired to optimize or test queries outside of a production environment, such as part of database design. In such cases, a query or query plan, such as an abstract query plan 250, can be provided to the auxiliary query optimization framework 230. The received abstract query plan 250 can be processed by one or more of the auxiliary query optimizers 234, to provide an optimized query plan, such as the optimized abstract query plan 254. The output of an auxiliary query optimizer 234 can be in a different format, such as an optimized logical query plan.

The auxiliary query optimizers 234 typically differ from the query optimizer 216 in at least some way. Query optimizers, generally, may be of different types. Types of query optimizers can include rule-based optimizers, cost-based optimizers, transformation optimizers, global optimizers, "what-if" optimizers, and heuristic optimizers.

Rule-based optimizers use a predetermined set of rules to optimize queries. Cost-based optimizers evaluate various logical query plans that can be generated from an initial logical query plan and select the one with the lowest estimated cost, usually in terms of I/O, CPU usage, or other factors. Transformation optimizers transform high-level queries into a sequence of low-level physical operations. These transformations might include simplifying the query, removing redundancies, or restructuring the query. A global query optimizer (which can also be referred to as a "distributed query optimizer") focuses on optimizing queries across distributed databases. It tries to minimize data movement across nodes, and makes decisions such as which node should perform which operation.

"What-if" query optimizers allow for hypothetical analysis. Such a query optimizer can be used to predict the impact of potential changes without actually implementing them. For example, a user might ask how the performance would change if an index were added to a table. A heuristic optimizer uses heuristics (i.e., rule-of-thumb strategies) to find a satisfactory solution to query optimization. It might not always find the most optimal solution, but it can find a reasonably good solution quickly.

A further type of query optimizer is a workload optimizer. Workload optimizers focus on optimizing the execution of a set of queries or operations, not just a single query. Their view is broader, looking at the entire workload that a database system is handling at any given time. Workload optimization can consider a best order to execute queries in a queue, or whether two queries can be executed in parallel without causing contention. Workload query optimizers can also consider how resources can be allocated among competing queries or tasks. A workload query optimizer can dynamically adjust system parameters, query execution priorities, or resource allocation based on the current workload and system performance goals.

It is not uncommon for databases to use multiple types of query optimization techniques. For example, a database can select a particular optimizer based on particular properties of a query, or a single optimizer can be "integrated" and perform multiple types of query optimization, including at different stages in a sequence, such as using heuristics to prune obviously suboptimal plans and then applying cost-based analysis.

The different types of optimizers can have various advantages and disadvantages. For example, some types of query optimizers may require less time and processing resources to achieve a result, but the result may be less optimal than a result produced by another query optimizer.

As an example, FIG. 2 illustrates the auxiliary query optimization framework 230 as including a workload-based query optimizer 234*a*, a distributed query optimizer 234*b*, and a predictive ("what-if") query optimizer 234*c*. The different auxiliary query optimizers 234 are shown for illustrative purposes, and in practice the auxiliary query optimization framework 230 can include more, fewer, or different types of auxiliary query optimizers than those shown in FIG. 2.

The auxiliary query optimizer framework 230, and the auxiliary query optimizers 234 thereof, can use query plan information provided in a format used by the query optimizer 216, or in another format. For example, it can be beneficial to provide a query plan to the auxiliary query optimization framework 230 in a format that is independent of a database system of which the query optimizer 216 is a part. For example, it can be useful to decouple a query plan from metadata used by the database system 206. Such decoupling can facilitate use of the auxiliary query optimization framework 230 on a computing system (or node thereof) separate from that operating the database system 206, which can allow for additional query optimization to be performed without taxing the computing resources of the database system.

Accordingly, the query optimizer 216 can include a converter 260, which can convert query plans between formats, such as between a format used by the query optimizer and a format used by the auxiliary query optimizer framework 230. The representation produced by the converter 260 can be referred to as an abstract query plan or a platform independent query plan. In other implementations, the auxiliary query optimization framework 230 includes a converter 262 that has analogous functionality to the converter 260, in addition to, or in place of, the converter 260. In some cases, the converter 262 converts an abstract query plan received from the database system 206 to a logical query plan, which is used by an auxiliary query processor. The converter 262 can convert an optimized logical plan back into an abstract query plan. Although shown as separate components, the converters 260 or 262 can be integrated into another component, such as the query optimizer 216 or an auxiliary query optimizer 234.

In a scenario where the auxiliary query optimization framework 230 provides a logical query plan to the query optimizer 216, or another component of the database system 206, such as the plan generator 224, the query optimizer (or other component) can include functionality for associating the logical query plan with metadata of the database system. In a further example, this functionality can be performed by the parser 212.

Figure 3:
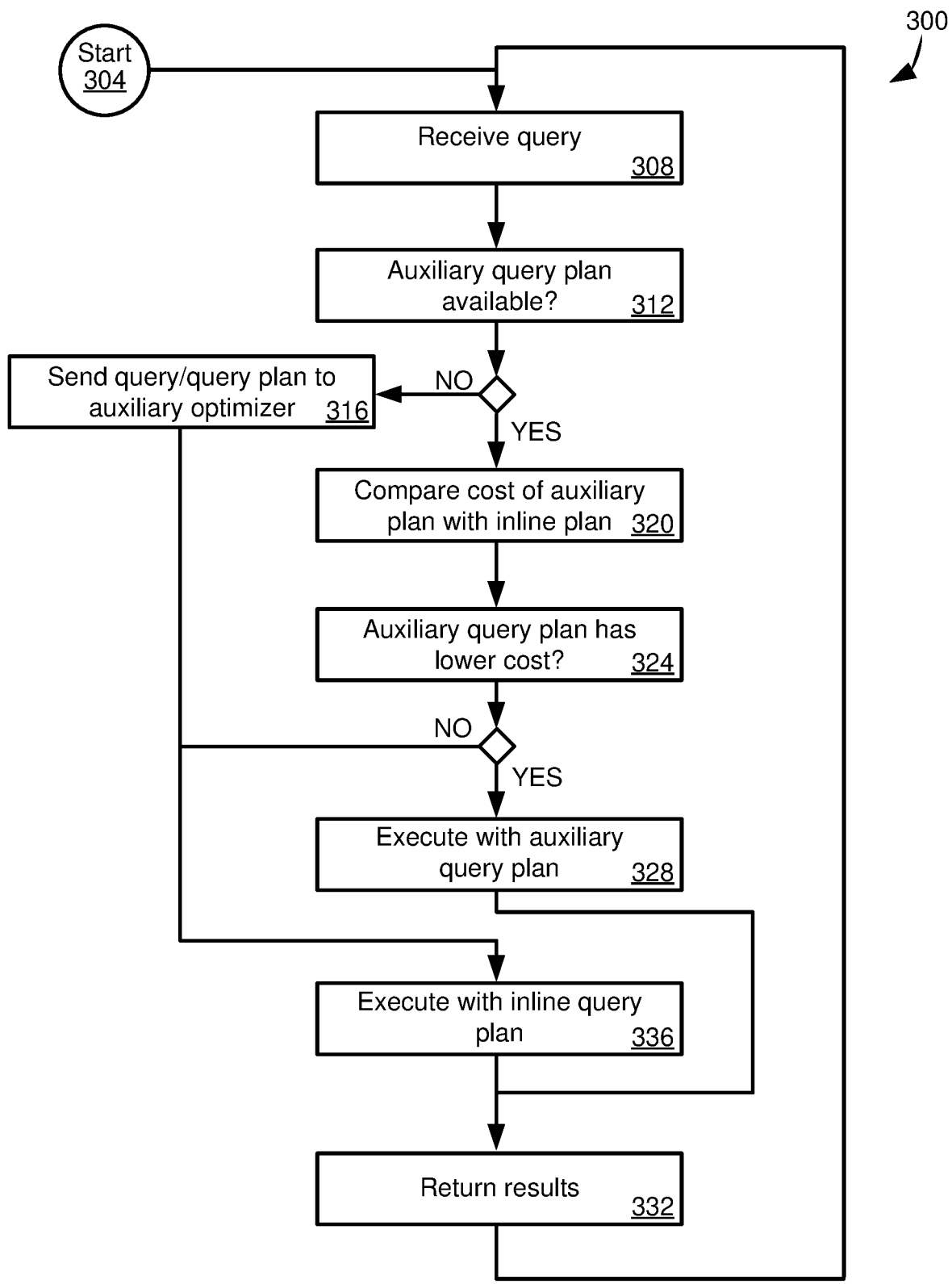
FIG. 3 is a flowchart of a process of determining whether to use an optimized query plan provided by an inline query optimizer or an optimized query plan provided by an auxiliary query optimizer.

Example 4—Example Processes of Determine when to Use an Optimized Query Plan of an Auxiliary Query Optimizer and of Determining when to Send a Query for Optimization by an Auxiliary Query Optimizer FIG. 3 is a flowchart of a process 300 of determining whether a query should be executed using a query plan provided by an inline query optimizer or a query plan provided by an auxiliary query optimizer. The process 300 starts at 304. A query is received at 308. It is determined at 312 whether an auxiliary query plan is available. If not, the query (or a query plan therefor) is sent to an auxiliary query optimizer at 316, which then optimizes the query to provide an optimized query plan.

If an auxiliary query plan exists, a cost of the auxiliary query plan is compared with a cost of an inline query plan at 320. It is determined at 324 whether the cost of the auxiliary query plan is lower than that of the inline query plan. If the cost of the auxiliary query plan is lower, the auxiliary query plan is executed at 328, which returns query execution results at 332. If the cost of the auxiliary query plan is higher, the inline query plan is executed at 336. The process 300 also proceeds to 336 after sending the query or query plan to the auxiliary query optimizer at 316.

After returning results at 332, the process 300 can return to 308, where another "instance" of the query (a request to execute a query having particular operations) is received. In this case, if it was previously determined at 312 that an auxiliary query plan was not available the process 300 can now proceed to 320, rather than 316.

Figure 4:
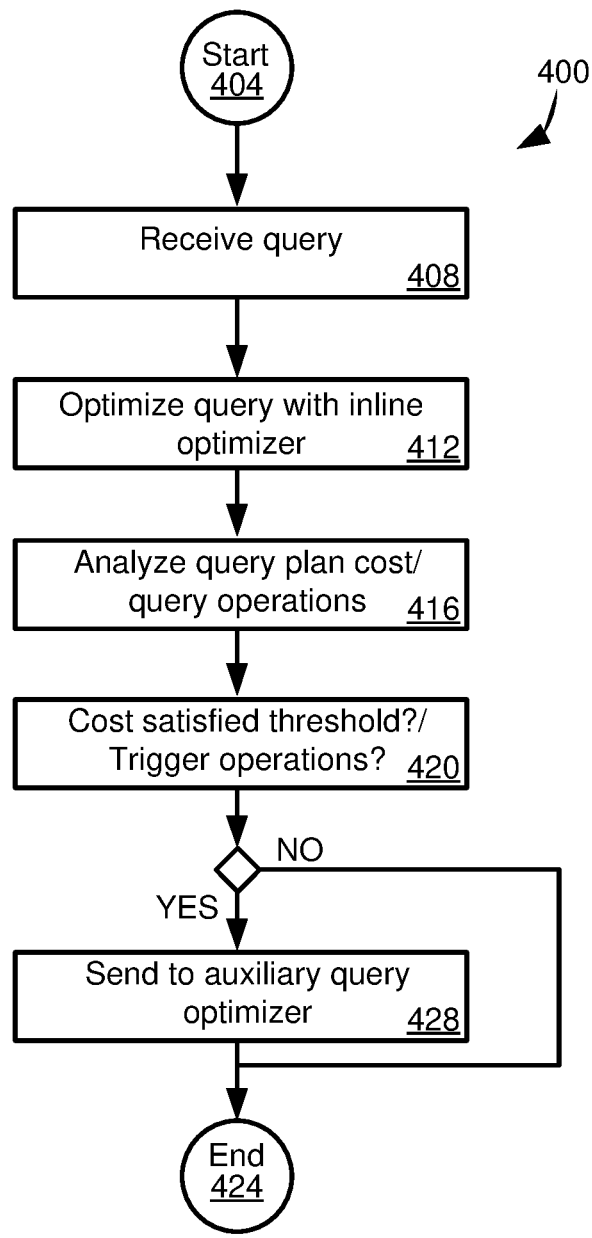
FIG. 4 is a flowchart of a process for determining whether to send a query to be optimized by an auxiliary query optimizer.

In some cases, it may be desirable to use an auxiliary query optimizer under certain conditions. FIG. 4 illustrates an example process 400 of determining whether an auxiliary optimizer should be used. Operations of the process 400 can be incorporated into the process 300 of FIG. 3

The process 400 begins at 404. At 408, a query is received. The query is optimized using an inline query optimizer at 412. A cost of the query plan or operations in the query plan are analyzed at 416. It is determined at 420 whether the cost of the inline query plan satisfies a threshold, or includes trigger operations. If it is determined at 420 that the threshold is not satisfied, or that no trigger operations are included in the query plan, the process can end at 424.

If it is determined at 420 that the query plan cost satisfies the threshold, or includes trigger operations, the query or query plan can be sent to an auxiliary query optimizer at 428. Examples of trigger operations include those that are associated with specific processing logic. For example, operations in a query that involve a distribute database may trigger processing of the query/query plan by an auxiliary query optimizer used for the specialized scenario of distributed databases.

Example 5—Example Invalidation of Auxiliary Query Plans

As described, in some cases it can be useful to provide an auxiliary query optimizer with a query plan or query that includes information associated with operations/data objects in the query, since it may be desirable to use resources of another computing system for auxiliary query optimization. A database system can undergo various changes that can alter the accuracy of a query plan. Accordingly, disclosed techniques provide processes of invalidating auxiliary query plans, or information used to generate auxiliary plans, and to optionally cause the generation of updated auxiliary query plans using updated information.

Examples of operations that affect metadata for data objects that may be used in query plan generation and analysis (such as for optimization) include structural changes to tables referenced in the query, such as changes to column names or column datatypes. Changes to view definitions can also affect query plan generation and analysis, as can dropping various type of database objects, such as tables, columns, views, or indexes.

In some implementations, triggers or similar types of event handlers can be placed on relevant data objects, and notifications can be provided to invalidate queries or query plans involving these objects, at least for systems that do not have access to updated metadata. In another example, system tables can track what query plans use particular database objects/database metadata. Versioning information can also be used determine when a query or query plan used by an auxiliary query optimizer might be out of date.

Plan invalidation can be incorporated into previously described processes, including the process 300 of FIG. 3. For example, when checking to see whether an auxiliary query plan exists, it can also be checked whether any events have occurred that result in the auxiliary query plan being invalidated.

Figure 5:
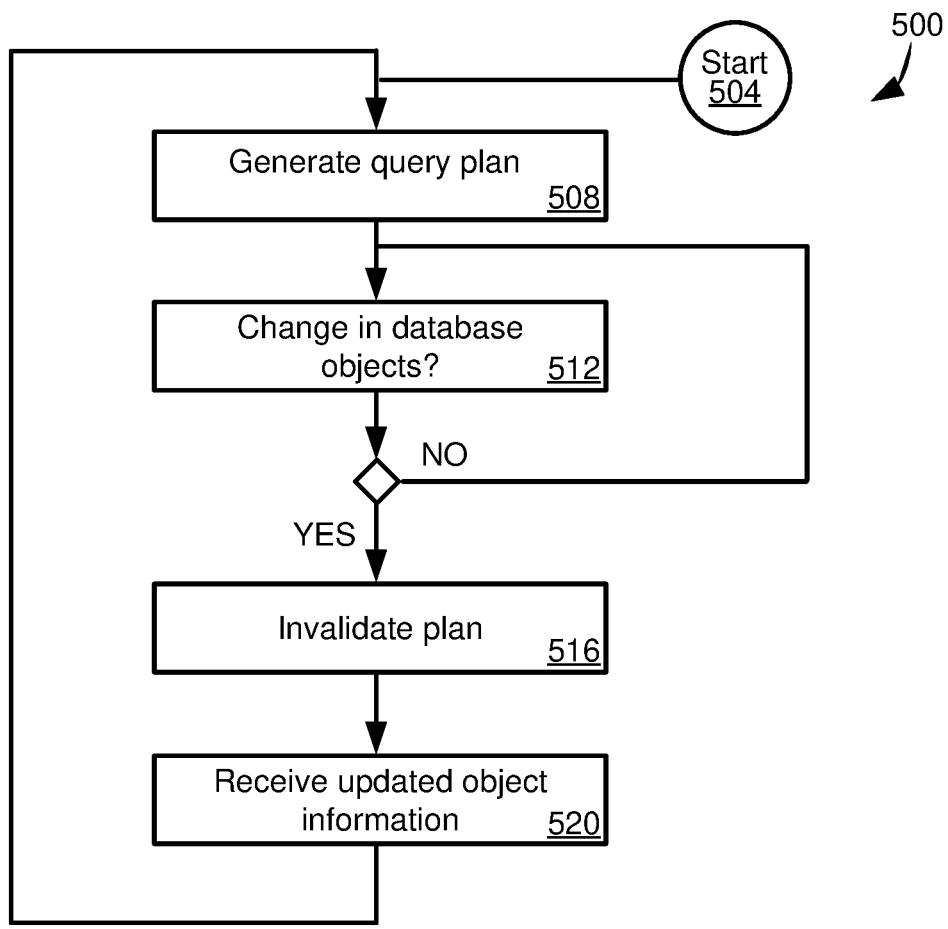
FIG. 5 is a flowchart of a process for determining whether to invalidate a query plan produced by auxiliary query optimizer produced using a query plan that comprises metadata for one or more data objects referenced in a query being optimized.

FIG. 5 illustrates a flowchart of an example process 500 for invalidating auxiliary query plans. The process begins at 504. At 508, an auxiliary query plan is generated. It is determined at 512 whether any changes to database objects, or other database metadata, associated with the query plan have been made. If not, the process 500 can loop back to 512 until a change is determined.

If it is determined at 512 that a change to a database object has occurred, one or more auxiliary query plans that use that database object are invalidated at 516.

Optionally, at 520, an auxiliary query optimizer can receive updated object information and an updated auxiliary query plan can be generated at 508.

Example 6—Example Auxiliary Query Optimizer Use Scenarios

Although disclosed technologies can be used in a variety of scenarios, several example use cases are described.

In one scenario, an auxiliary query optimizer can be a "what-if" optimizer. The "what-if" query optimizer can, for example, simulate an index and add the simulated index to a logical query plan. The query plan with the added index can then be optimized, and the cost of the query plan with the index can be compared with the cost of a query plan without the index.

As discussed, auxiliary optimizers can be used to determine query plans that make changes to the logic of an inline query optimizer, as opposed to, for example, using a completely different type of query optimizer. In one example, an auxiliary query optimizer can use different cardinality estimation techniques than the inline query optimizer. Potential changes to cardinality estimation logic can be evaluated using an auxiliary query optimizer before potentially implementing the changes in the inline query optimizer.

As another example, some types of cardinality estimation, such as using machine learning techniques, can consume too much time or resources to be used with an inline query optimizer. A query plan can be provided to an auxiliary query optimizer that uses such cardinality estimation logic query. Plans produced by the auxiliary query optimizer can optionally be used for future executions of the query.

One type of auxiliary query optimizer that has been described is a workload query optimizer. Query plans for queries in a workload can be provided to a workload query optimizer that acts as an auxiliary query optimizer. The auxiliary query optimizer can optimize the query plans in the workload, including with respect to one another, and the resulting optimized query plans for the queries in the workload can be used by the inline query optimizer.

Although the present discussion describes optimizing query plans, disclosed techniques can be used with view definitions or subplans for a query. This can be particularly useful for complex queries that may have a large search space. The views or subplans can be provided to one or more auxiliary query optimizers, optimized separately, and the results combined. Optimizing a query by using query components can also be beneficial as it can allow for optimization of different subplans to be parallelized.

Example 7—Example Query and Query Plans Generated Therefrom

The present disclosure generally describes queries that can be received by a database system and different types of plans that can be created based on a particular query, including logical plans, abstract plans, physical plans, and execution plans. While these terms are known in the art, the following discussions explains how these different types of plans can be used in query processing, including various differences between plan types. The discussion refers to FIGS. 6A and 6B.

Figure 6A:
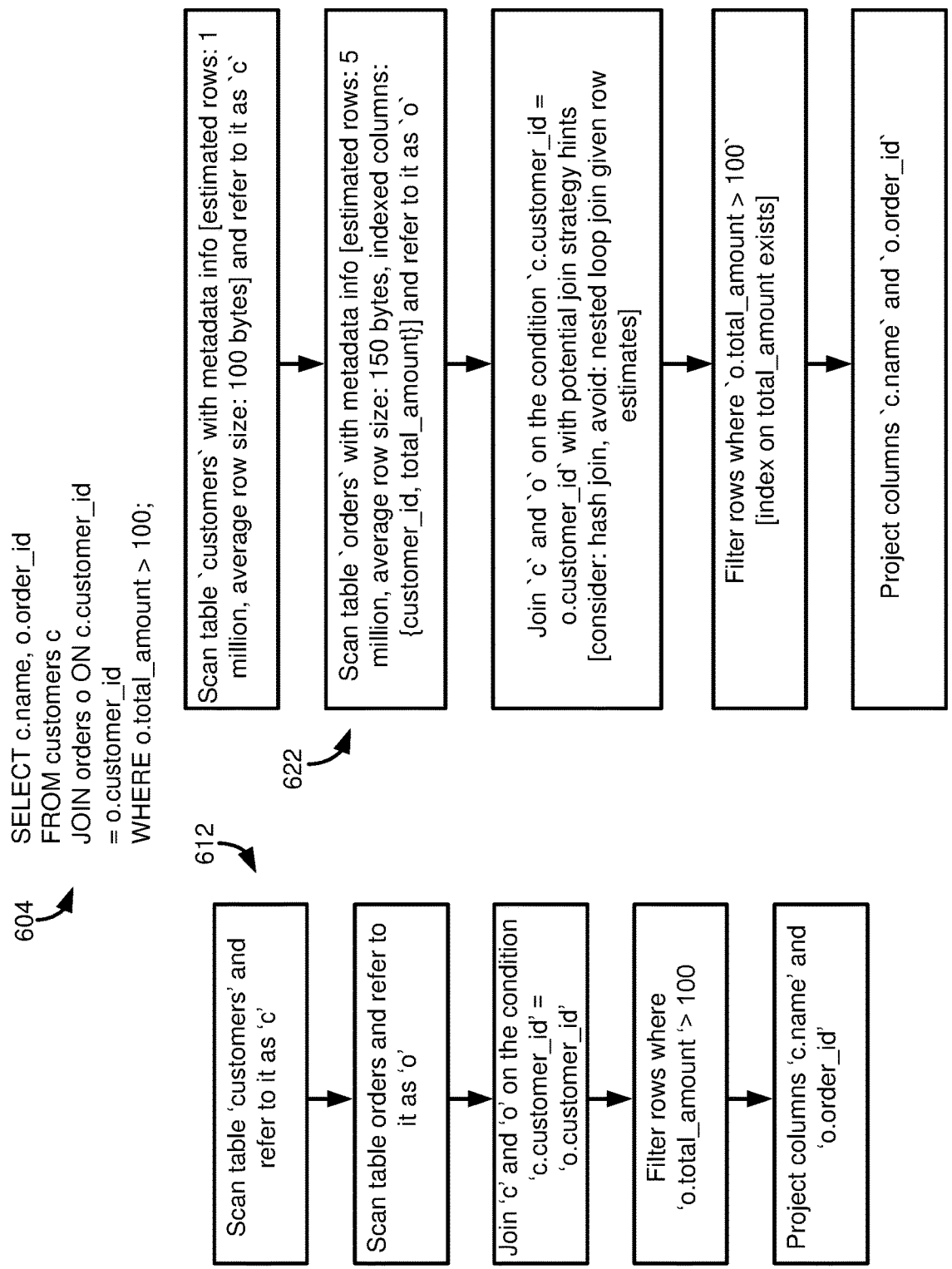
FIGS. 6A and 6B illustrate an example query and different types of query plans that can be generated therefrom.

FIG. 6A provides a simple illustrative query 604. The query 604 provides a projection of two columns resulting from a join between an orders table and a customer table, with a filter condition that the total amount of an order is greater than 100. A first step in processing the query 604 is to produce a parse tree, such as described for the parser 212 of FIG. 2.

A logical plan, such as the logical plan 612, can be produced from the parse tree, or more particularly from an abstract syntax tree that is produced from the parse tree. A logical plan represents the high-level operations needed to carry out the query, such as joins, filter operations, and aggregation operations. A logical plan summarizes what operations need to occur in executing the query, as opposed to specifying how those operations should be carried out. For instance, for a query joining two tables and selecting certain columns, the logical plan will detail the join and column selection without specifying the method of join or data access.

An abstract query plan (AQP), such as abstract query plan 622, can be generated from the logical plan. In turn, the abstract query plan can be used to generate a logical query plan. An abstract query plan can also be generated directly from a parse tree. The abstract query plan also provides a high-level abstraction of query operations, but, as compared with a logical query plan, is enhanced with additional metadata about the database, including database objects used in the query. An abstract query plan can incorporate placeholders for operations that can be finalized later, such as in a physical query plan after optimization of the logical query plan, and annotations about database objects. These annotations can include information such as the presence of an index on a table involved in a join or statistics about the distribution of values in a column of a data object used in a query.

Figure 6B:
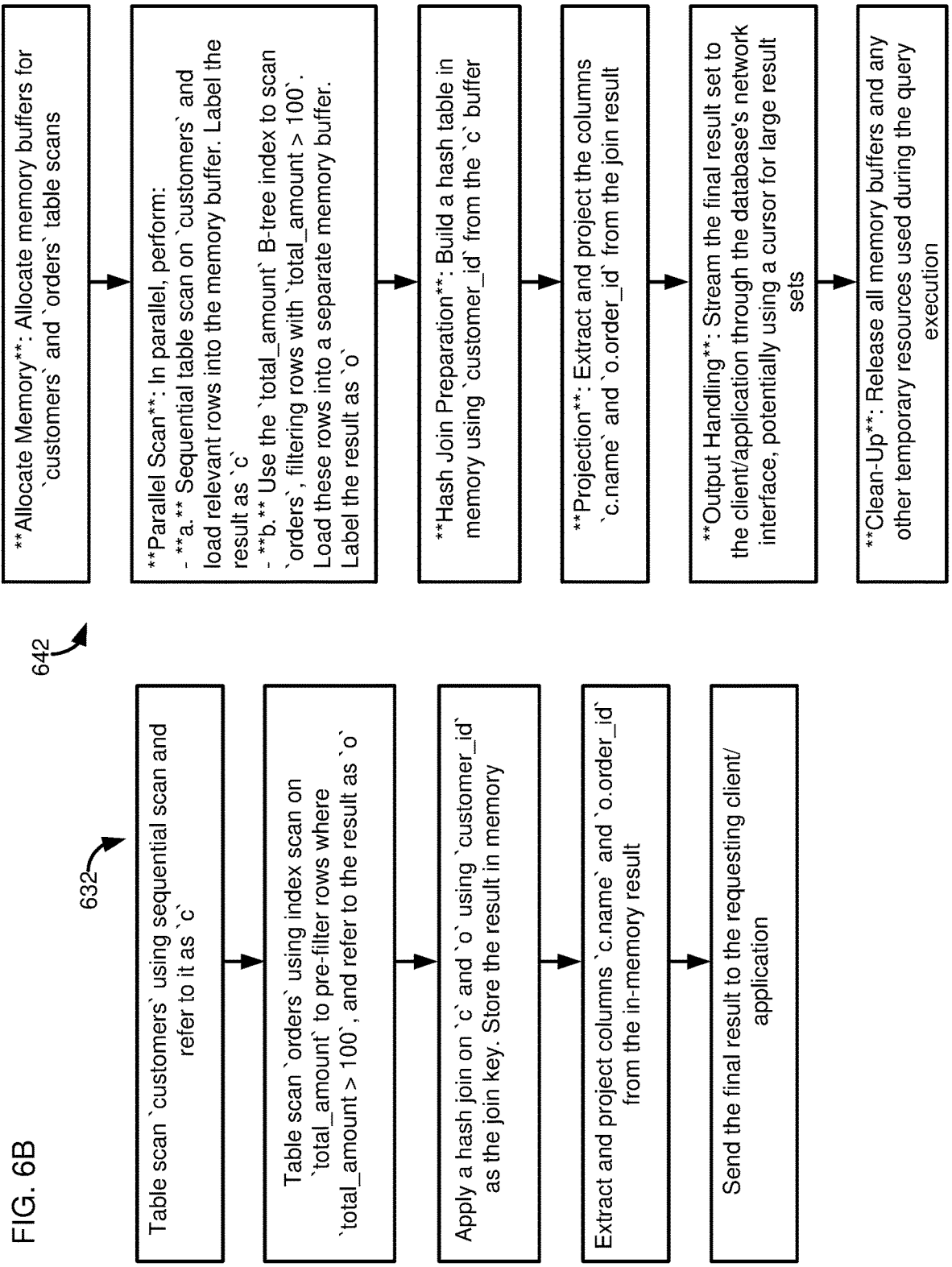

A physical query plan, such as physical query plan 632 of FIG. 6B, can be generated from a logical query plan or an abstract query plan, typically after the logical query plan has been optimized. The physical query plan includes details about not just what operations should be performed, but how they should be performed. For example, generating the physical query plan can include determining specific algorithms to be used during execution, such as whether to use a hash join or a nested loop join, and access methods, like a full table scan versus an index seek.

An execution plan, such as the execution plan 642, can be generated from the physical query plan. The execution plan can be considered a fine-tuned implementation or adaptation of the physical plan, generated taking into account the specifics of an underlying database system. The execution plan is created using details such as the architecture of a database, system, exact data locations, partitioning techniques, and available computational resources. Execution plans are intended to be executed by a database system, including potentially being pre-compiled into machine code for rapid execution. For the join operation in the query 604, the execution plan would be aware of the precise memory locations of the tables, any existing data partitioning, and might even include executing parts of the join operation concurrently across multiple CPU cores.

Figure 7:
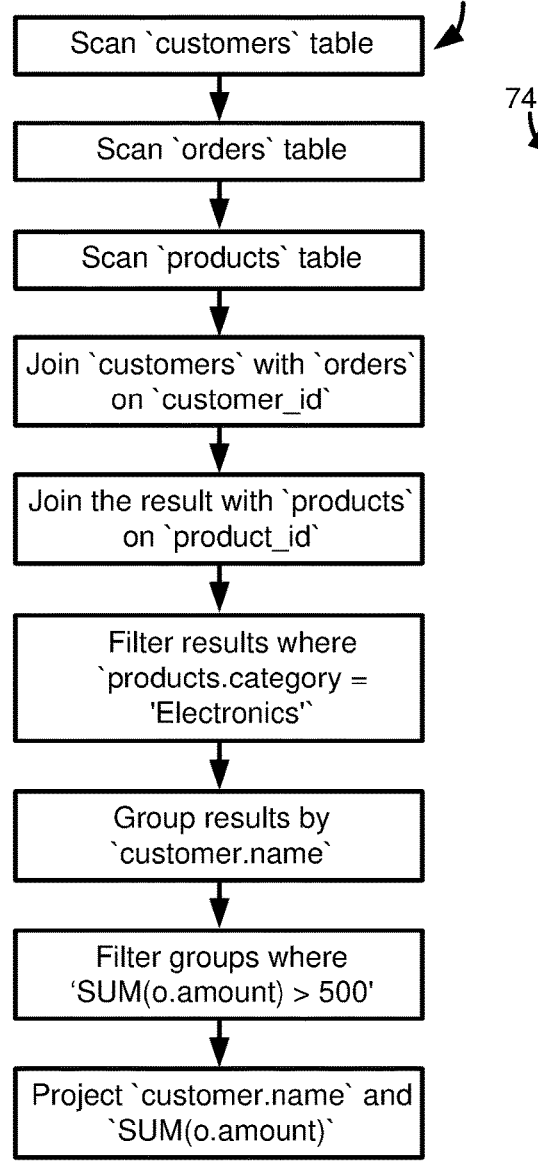
FIG. 7 illustrates a query that is more complex than the query of FIGS. 6A and 6B, and corresponding logical and abstract query plans.
Figure 7:
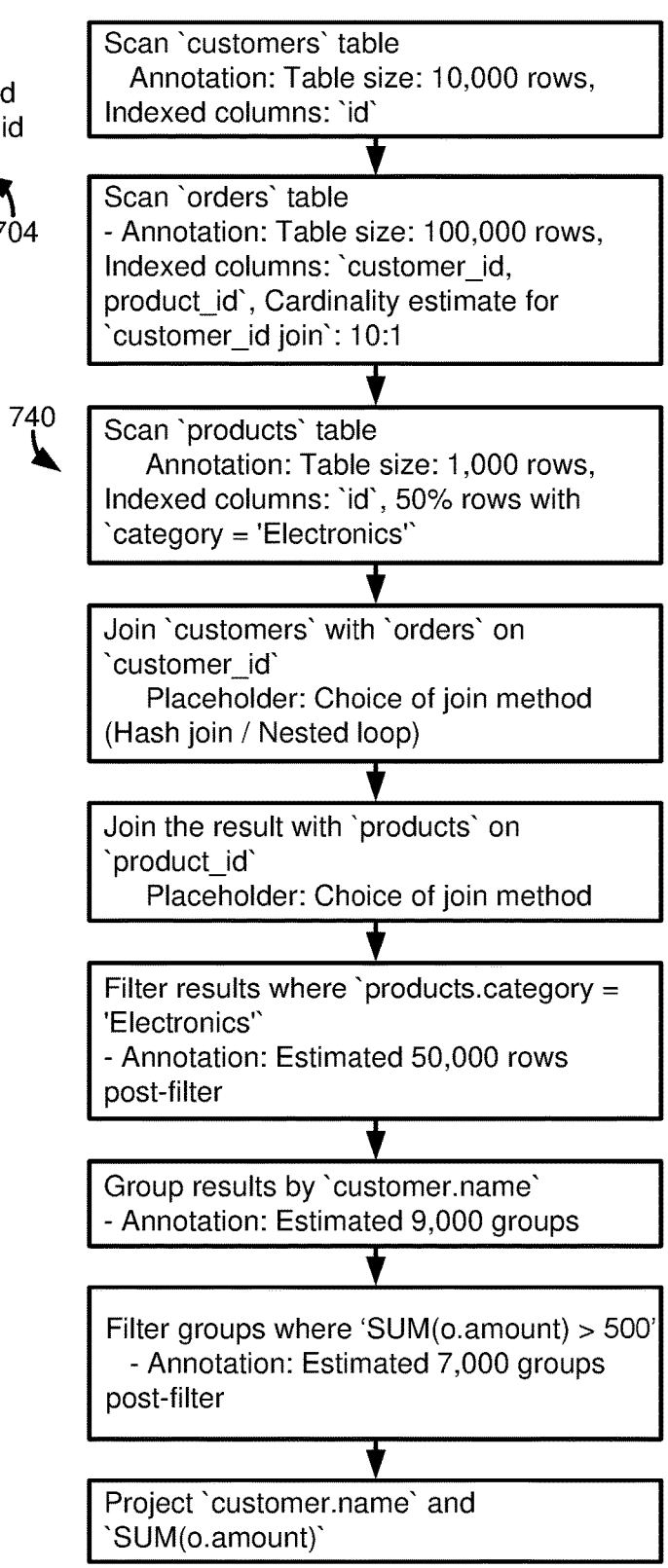

FIG. 7 illustrates a slightly more complex query 704, as well as a logical query plan 720 and an abstract query plan 740 that can be produced from the query 704. The abstract query plan 740 further illustrates how sharing of abstract query plans between different computing systems can be beneficial as opposed to sharing logical query plans or even physical plans, since the abstract query plan encapsulates relevant database metadata.

Example 8—Example Query Processing Operations Using Auxiliary Query Optimizer

Figure 8:
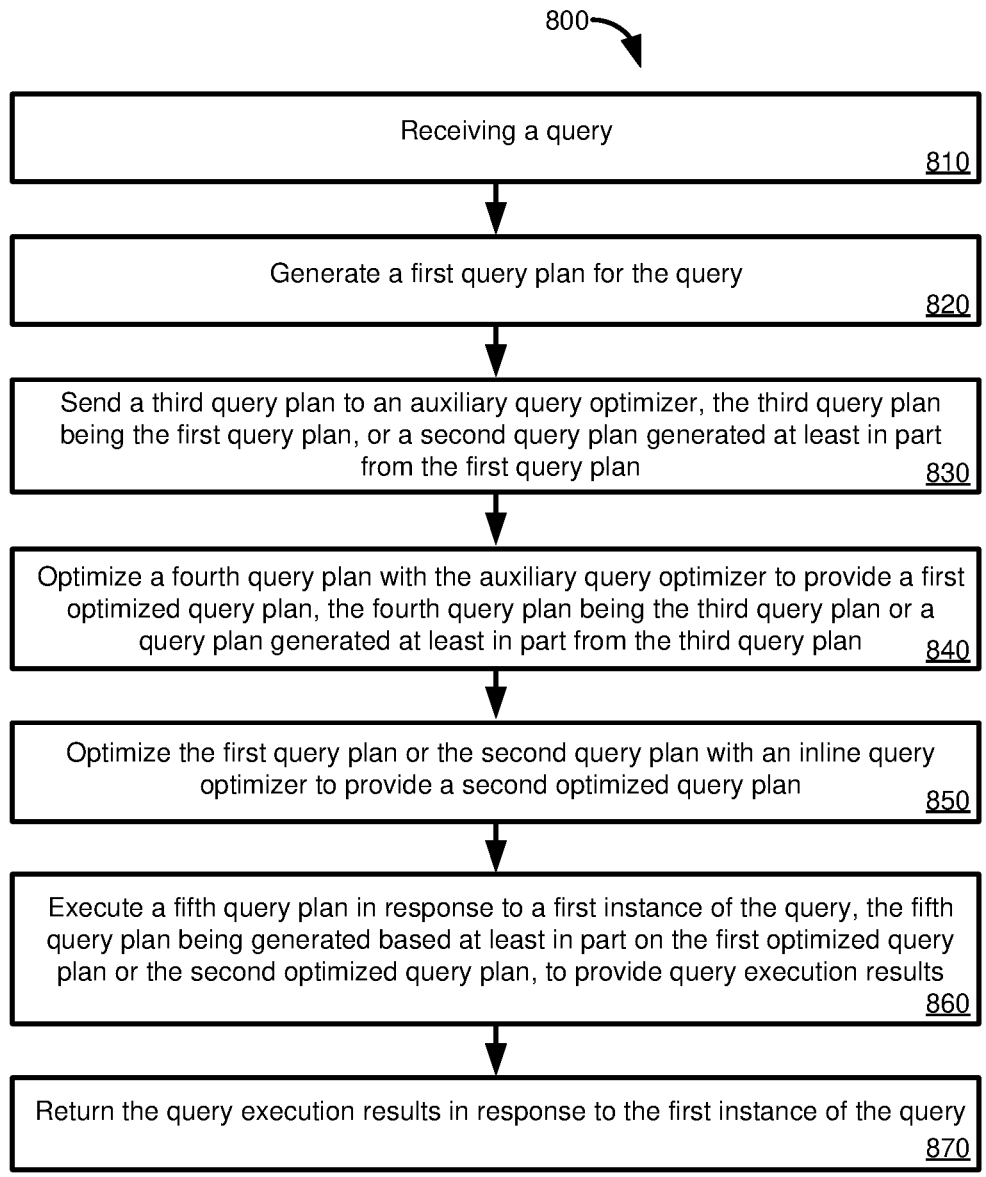
FIG. 8 is a flowchart of a process of executing a query using a query plan optimized by an auxiliary query optimizer or an inline query optimizer.

FIG. 8 illustrates a flowchart of a process 800 of executing a query using a query plan optimized by an auxiliary query optimizer or an inline query optimizer. A query is received at 810. At 820, a first query plan for the query is generated. A third query plan is sent to an auxiliary query optimizer at 830. The third query plan is the first query plan, or a second query plan generated at least in part from the first query plan.

A 840, a fourth query plan is optimized with the auxiliary query optimizer to provide a first optimized query plan. The fourth query plan is the third query plan, or a query plan generated at least in part from the third query plan.

The first query plan or the second query plan is optimized at 850 with an inline query optimizer to provide a second optimized query plan. A fifth query plan is executed at 860 in response to a first instance of the query. The fifth query plan is generated based at least in part on the first optimized query plan or the second optimized query plan. Execution of the fifth query plan provides query execution results. At 870, query execution results are returned in response to the first instance of the query.

Example 9—Computing Systems

Figure 9:
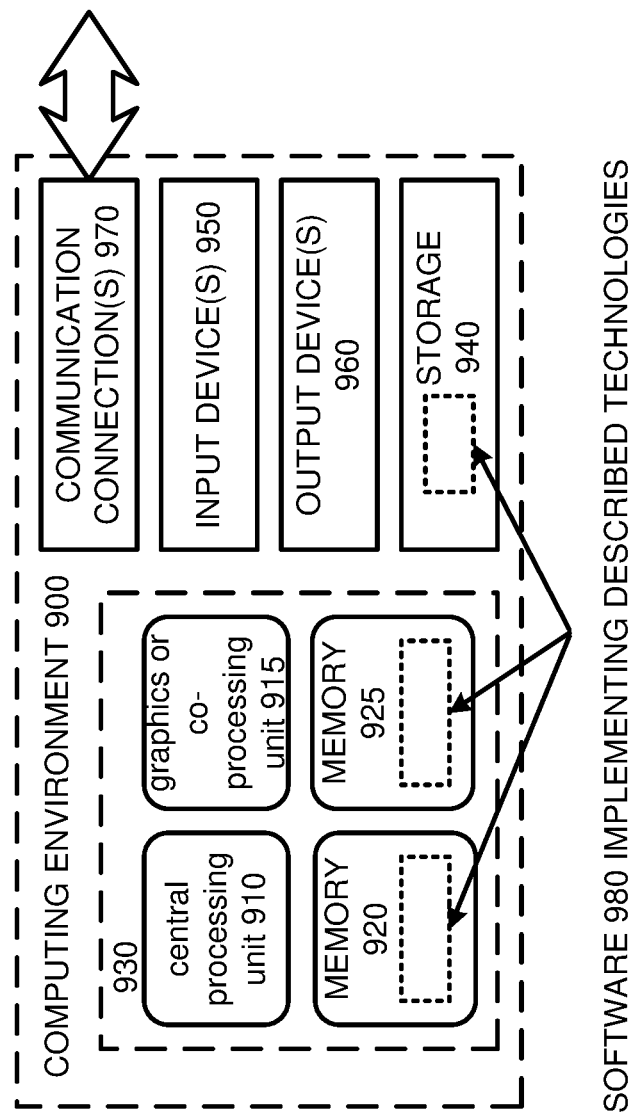
FIG. 9 is a diagram of an example computing system in which some described embodiments can be implemented.

FIG. 9 depicts a generalized example of a suitable computing system 900 in which the described innovations may be implemented. The computing system 900 is not intended to suggest any limitation as to scope of use or functionality of the present disclosure, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions, such as for implementing a database environment, and associated methods, described in Examples 1-8. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), nonvolatile memory (e.g., ROM, EEPROM, flash memory, etc.), or some combination of the two, accessible by the processing unit(s) 910, 915. The memory 920, 925 stores software 980 implementing one or more innovations described herein, in the form of computer-executable instructions suitable for execution by the processing unit(s) 910, 915.

A computing system 900 may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way, and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. The output device(s) 960 may be a display, printer, speaker, CD-writer, or another device that provides output from the computing system 900.

The communication connection(s) 970 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 10:
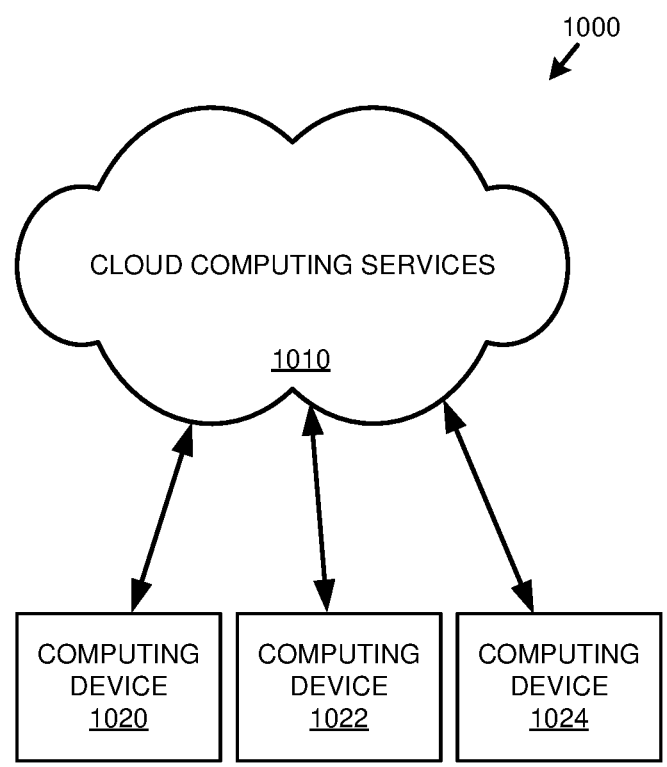
FIG. 10 is an example cloud computing environment that can be used in conjunction with the technologies described herein.

FIG. 10 depicts an example cloud computing environment 1000 in which the described technologies can be implemented. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operators (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 9, computer-readable storage media include memory 920 and 925, and storage 940. The term computer-readable storage media does not include signals and carrier waves. In addition, the term computer-readable storage media does not include communication connections (e.g., 970).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, Structured Query Language, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one memory;
   one or more hardware processor units coupled to the at least one memory; and
   one or more computer readable storage media storing computer-executable instructions that, when executed, cause the computing system to perform operations comprising:
   receiving a query;
   generating a first query plan for the query, the first query plan being a common query plan, where an auxiliary query optimizer optimizes the common query plan or a first derived query plan derived from the common query plan and where an inline query optimizer optimizes the common query plan or a second derived query plan derived from the common query plan, wherein the second derived query plan is the first derived query plan or is a different derived query plan;
   sending a third query plan to the auxiliary query optimizer, the third query plan being the first query plan, or a second query plan generated at least in part from the first query plan, wherein the auxiliary query optimizer modifies the third query plan to improve execution performance;
   optimizing a fourth query plan with the auxiliary query optimizer to provide a first optimized query plan, the fourth query plan being the third query plan, or a query plan generated at least in part from the third query plan;
   optimizing the first query plan or the second query plan with the inline query optimizer to provide a second optimized query plan, wherein the inline query optimizer is different from the auxiliary query optimizer and modifies the first query plan or the second query plan to improve execution performance during query execution;
   selecting a fifth query plan, the fifth query plan being generated using the first optimized query plan or the second optimized query plan, based on selection criteria;
   executing the fifth query plan in response to a first instance of the query to provide query execution results; and
   returning the query execution results in response to the first instance of the query.

2. The computing system of claim 1, wherein the third query plan is an abstract query plan and the fourth query plan is a logical query plan generated from the abstract query plan.

3. The computing system of claim 2, wherein the third query plan comprises metadata for one or more data objects referenced in the query.

4. The computing system of claim 3, wherein the auxiliary query optimizer does not have access to the metadata other than through the third query plan.

5. The computing system of claim 2, the operations further comprising:
   determining that one or more elements of the metadata have been changed or deleted; and
   based at least in part on determining that one or more elements of the metadata have been changed or deleted, invalidating the second optimized query plan.

6. The computing system of claim 1, wherein the third query plan is a logical query plan.

7. The computing system of claim 1, wherein the fifth query plan is a query execution plan.

8. The computing system of claim 1, the operations further comprising:
   comparing a cost of the first optimized query plan with a cost of the second optimized query plan; and
   selecting as a sixth query plan a query plan having the lowest cost, wherein the fifth query plan is the sixth query plan or is generated at least in part from the sixth query plan.

9. The computing system of claim 1, wherein the inline query optimizer and the auxiliary query optimizer are of different types.

10. The computing system of claim 1, wherein the inline query optimizer and the auxiliary query optimizer are of a common type, but query optimizer logic or configuration parameters differ between the inline query optimizer and the auxiliary query optimizer.

11. The computing system of claim 1, wherein the auxiliary query optimizer is part of a query optimizer framework that comprises a plurality of auxiliary query optimizers.

12. The computing system of claim 11, wherein the auxiliary query optimizer is a first auxiliary query optimizer of a first type and a second auxiliary query optimizer of the plurality of auxiliary query optimizers is of a second type, the second type being different than the first type.

13. The computing system of claim 1, wherein the query is a first query, the operations further comprising:
receiving, by the auxiliary query optimizer, a sixth query plan for a second query, wherein the second query plan is not provided by a database system that comprises the inline query optimizer; and
optimizing the sixth query plan with the auxiliary query optimizer to provide a third optimized query plan.

14. The computing system of claim 1, wherein the auxiliary query optimizer does not use computing resources of a computing system comprising the inline query optimizer while optimizing the fourth query plan.

15. The computing system of claim 1, wherein sending the third query plan to the auxiliary query optimizer is performed in response to receiving the first instance of the query.

16. The computing system of claim 15, the operations further comprising:
for a second instance of the query, determining whether to use the first optimized query plan or the second optimized query plan based on respective costs of the first optimized query plan and the second optimized query plan.

17. The computing system of claim 1, wherein sending the third query plan to the auxiliary query optimizer is performed in response to determining that the query comprises at least one operation of a particular type.

18. The computing system of claim 1, wherein sending the third query plan to the auxiliary query optimizer is performed in response to determining that a cost of the first optimized query plan satisfies a threshold.

19. A method, implemented in a computing system comprising at least one hardware processor and at least one memory coupled to the at least one hardware processor, the method comprising:
receiving a query;
generating a first query plan for the query, the first query plan being a common query plan, where an auxiliary query optimizer optimizes the common query plan or a first derived query plan derived from the common query plan and where an inline query optimizer optimizes the common query plan or a second derived query plan derived from the common query plan, wherein the second derived query plan is the first derived query plan or is a different derived query plan;
sending a third query plan to the auxiliary query optimizer, the third query plan being the first query plan, or a second query plan generated at least in part from the first query plan, wherein the auxiliary query optimizer modifies the third query plan to improve execution performance;
optimizing a fourth query plan with the auxiliary query optimizer to provide a first optimized query plan, the fourth query plan being the third query plan, or a query plan generated at least in part from the third query plan;
optimizing the first query plan or the second query plan with the inline query optimizer to provide a second optimized query plan, wherein the inline query optimizer is different from the auxiliary query optimizer and modifies the first query plan or the second query plan to improve execution performance during query execution;
selecting a fifth query plan, the fifth query plan being generated using the first optimized query plan or the second optimized query plan, based on selection criteria;
executing the fifth query plan in response to a first instance of the query to provide query execution results; and
returning the query execution results in response to the first instance of the query.

20. One or more non-transitory computer-readable storage media comprising:
computer-executable instructions that, when executed by a computing system comprising at least one hardware processor and at least one memory coupled to the at least one hardware processor, cause the computing system to receive a query;
computer-executable instructions that, when executed by the computing system, cause the computing system to generate a first query plan for the query, the first query plan being a common query plan, where an auxiliary query optimizer optimizes the common query plan or a first derived query plan derived from the common query plan and where an inline query optimizer optimizes the common query plan or a second derived query plan derived from the common query plan, wherein the second derived query plan is the first derived query plan or is a different derived query plan;
computer-executable instructions that, when executed by the computing system, cause the computing system to send a third query plan to the auxiliary query optimizer, the third query plan being the first query plan, or a second query plan generated at least in part from the first query plan, wherein the auxiliary query optimizer modifies the third query plan to improve execution performance;
computer-executable instructions that, when executed by the computing system, cause the computing system to optimize a fourth query plan with the auxiliary query optimizer to provide a first optimized query plan, the fourth query plan being the third query plan, or a query plan generated at least in part from the third query plan;
computer-executable instructions that, when executed by the computing system, cause the computing system to optimize the first query plan or the second query plan with the inline query optimizer to provide a second optimized query plan, wherein the inline query optimizer is different from the auxiliary query optimizer and modifies the first query plan or the second query plan to improve execution performance during query execution;
computer-executable instructions that, when executed by the computing system, cause the computing system to select a fifth query plan, the fifth query plan being generated using the first optimized query plan or the second optimized query plan, based on selection criteria;

computer-executable instructions that, when executed by the computing system, cause the computing system to execute the fifth query plan in response to a first instance of the query to provide query execution results; and computer-executable instructions that, when executed by the computing system, cause the computing system to return the query execution results in response to the first instance of the query.

\* \* \* \* \*